(12) United States Patent
Cap et al.

(10) Patent No.: US 8,246,787 B2
(45) Date of Patent: Aug. 21, 2012

(54) SOLAR DESALINIZATION PLANT

(75) Inventors: Daniel P. Cap, Chatsworth, CA (US);
Alan V. von Arx, Northridge, CA (US)

(73) Assignee: Pratt & Whitney Rockedyne, Inc.,
Canoga Park, CA (US)

( * ) Notice: Subject to any disclaimer, the term of this patent is extended or adjusted under 35 U.S.C. 154(b) by 254 days.

(21) Appl. No.: 12/553,437

(22) Filed: Sep. 3, 2009

(65) Prior Publication Data
US 2011/0048921 A1  Mar. 3, 2011

(51) Int. Cl.
*B01D 1/28*  (2006.01)
*B01D 3/10*  (2006.01)

(52) U.S. Cl. ........ 202/82; 203/10; 203/DIG. 1; 159/903

(58) Field of Classification Search ............... 202/180; 203/10, 11, 40, 41, 88, DIG. 1; 159/2.1, 159/903
See application file for complete search history.

(56) References Cited

U.S. PATENT DOCUMENTS

| | | | | |
|---|---|---|---|---|
| 3,300,393 A | * | 1/1967 | Fisher | 203/10 |
| 3,928,145 A | * | 12/1975 | Othmer | 203/11 |
| 4,110,174 A | * | 8/1978 | Carson | 203/11 |
| 4,111,810 A | * | 9/1978 | Arai et al. | 210/653 |
| 4,338,922 A | * | 7/1982 | Moore | 126/714 |
| 4,595,459 A | | 6/1986 | Kusakawa et al. | |
| 4,921,580 A | | 5/1990 | Martes et al. | |
| 4,959,127 A | | 9/1990 | Michna | |
| 5,053,110 A | | 10/1991 | Deutsch | |
| 5,064,505 A | | 11/1991 | Borgren | |
| 5,198,076 A | | 3/1993 | Borgren | |
| 5,346,592 A | | 9/1994 | Madani | |
| 5,395,070 A | * | 3/1995 | Stirbl et al. | 244/2 |
| 5,468,340 A | * | 11/1995 | Gupta et al. | 216/67 |
| 5,582,690 A | | 12/1996 | Weinberger et al. | |
| 5,593,549 A | | 1/1997 | Stirbl et al. | |
| 5,645,693 A | * | 7/1997 | Gode | 202/173 |
| 5,925,223 A | | 7/1999 | Simpson et al. | |
| 6,083,382 A | | 7/2000 | Bird | |
| 6,185,940 B1 | * | 2/2001 | Prueitt | 60/649 |
| 6,391,205 B1 | | 5/2002 | McGinnis | |
| 6,607,639 B1 | | 8/2003 | Longer | |
| 6,663,750 B1 | | 12/2003 | Coon | |
| 7,067,044 B1 | | 6/2006 | Coon | |
| 7,459,064 B2 | | 12/2008 | Anderson | |
| 7,525,214 B2 | | 4/2009 | Atilano Medina et al. | |

(Continued)

FOREIGN PATENT DOCUMENTS

DE  2510168  9/1976

(Continued)

OTHER PUBLICATIONS

Abdelkader, M., "Investigation of mutli-effect humidifcation-dehumidification solar desalination system coupled with solar central receiver", The 2nd International Conference on Water Resources and Arid Environments, pp. 1-18, 2006.*

(Continued)

*Primary Examiner* — Duane Smith
*Assistant Examiner* — Patrick McCarty
(74) *Attorney, Agent, or Firm* — Carlson, Gaskey & Olds PC

(57) ABSTRACT

A desalinization plant and process utilizes solar radiation to produce steam from seawater which is then used to generate freshwater and electricity.

10 Claims, 3 Drawing Sheets

U.S. PATENT DOCUMENTS

| | | |
|---|---|---|
| 7,527,711 B2 | 5/2009 | Ciudaj |
| 2002/0067753 A1 | 6/2002 | Ullman et al. |
| 2004/0072040 A1 | 4/2004 | Duffy et al. |
| 2004/0205032 A1 | 10/2004 | Routtenberg et al. |
| 2005/0109394 A1 | 5/2005 | Anderson |
| 2011/0048006 A1* | 3/2011 | Cap et al. ............... 60/641.5 |

FOREIGN PATENT DOCUMENTS

| | | |
|---|---|---|
| DE | 10151904 | 5/2003 |
| DE | 10326027 | 12/2004 |
| EP | 1519108 | 3/2005 |
| EP | 1982954 | 10/2008 |

OTHER PUBLICATIONS http://www.energy.ca.gov/sitingcases/solartwo/index.html, Ses Solar Two Project.

The Solar Project, http://en.wikipedia.org/wiki/The_Solar_Project.

International Search Report and Written Opinion Mailed Dec. 23, 2010.

International Search Report and Written Opinion mailed Mar. 15, 2012.

* cited by examiner

SOLAR DESALINIZATION PLANT

BACKGROUND

The present disclosure relates to a desalination system, and more particularly to a desalination system which utilizes concentrated solar power.

The need for freshwater is ever increasing and with areas of the world experiencing droughts, the economic impacts are becoming more severe. Desalination systems to supplement naturally available freshwater for increased residential, industrial, and farming applications throughout the world are of significant desirability.

SUMMARY

A desalinization plant according to an exemplary aspect of the present disclosure includes a concentrated solar power system. A heat exchanger is in fluid communication with the concentrated solar power system through a seawater loop which transfers energy to seawater within the seawater loop to extract steam from the seawater. A turbine is driven by the steam and a condenser downstream of the turbine produces freshwater from the steam.

A process for producing freshwater includes: absorbing energy from a concentrated solar power system into seawater communicated through the heat exchanger; extracting steam from the seawater; driving a turbine with the steam; and condensing the steam downstream of the turbine to produce freshwater.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
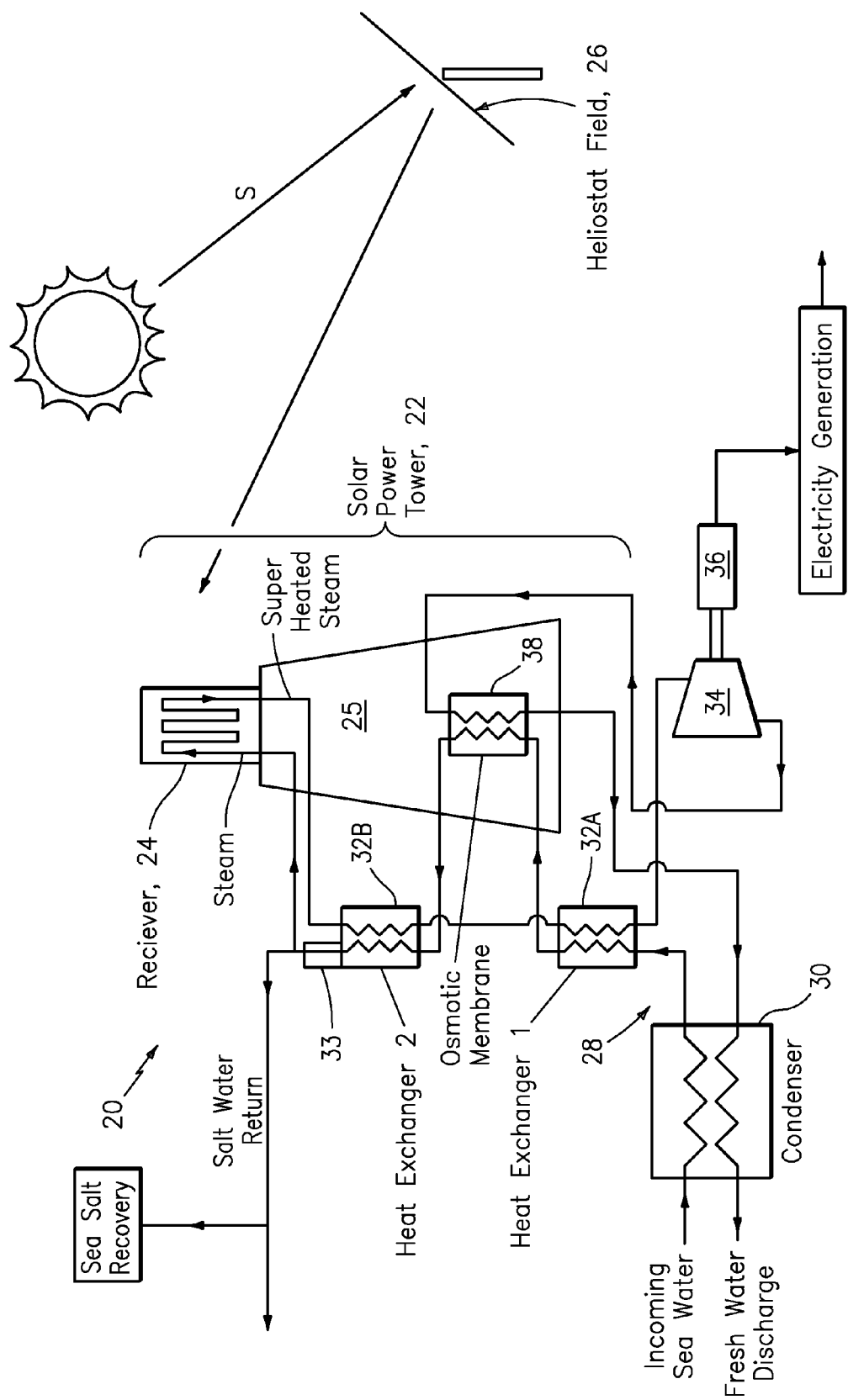
FIG. 1 is a schematic diagram of a desalination plant according to the present disclosure.

Referring to FIG. 1, a desalinization plant 20 includes a concentrated solar power system 22 having a receiver 24 coupled to a tower structure 25 at a predetermined height above ground to receive solar radiation S from a multiple of sun-tracking heliostats 26. The heliostats 26 reflect solar radiation S onto the receiver 24. The receiver 24 commonly includes multiple tubes typically manufactured of highly temperature-resistant materials. Although a power tower concentrated solar power system 22 is illustrated in the disclosed, non-limiting embodiment, it should be understood that other concentrated solar power systems such as parabolic troughs and other systems inclusive of non-solar systems may alternatively be utilized. It should also be understood that although a particular component arrangement is disclosed in the schematically illustrated embodiment, other components arrangements may alternatively or additionally be utilized.

A seawater loop 28 communicates seawater through the concentrated solar power system 22. The seawater loop 28 generally includes a condenser 30, at least one heat exchanger 32A, 32B, a steam turbine 34 and an electric generator 36. The seawater loop 28 receives seawater from a sea, ocean or other point of origin for communication through the condenser 30.

Figure 2:
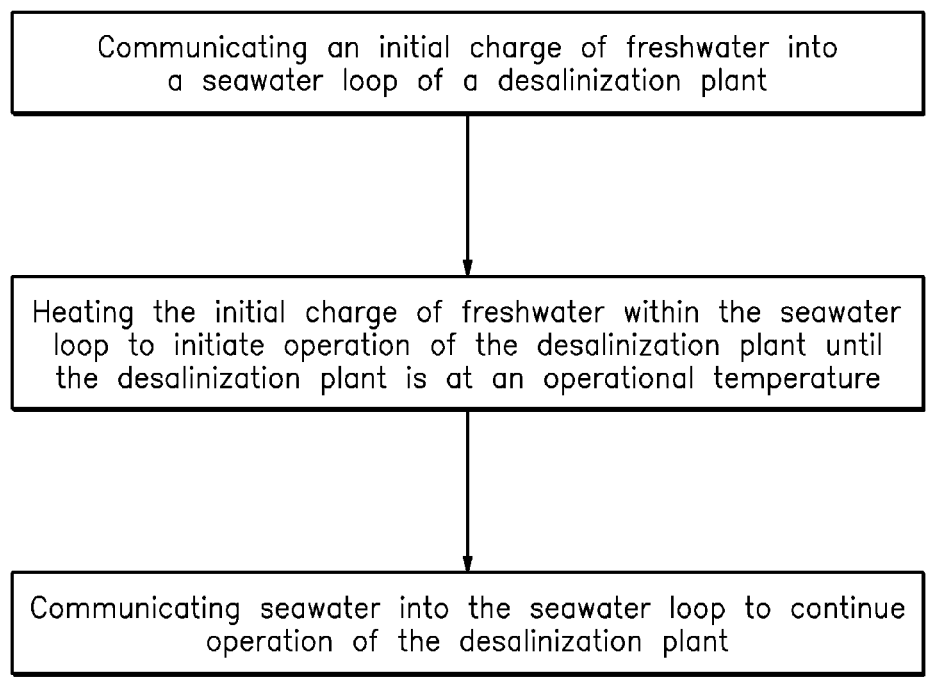
FIG. 2 is a flowchart illustrating operation of the desalination plant.

In operation, the desalinization plant 20 utilizes the solar radiation S to produce steam from seawater which is then used to generate freshwater and electricity to power the desalinization plant 20. An initial charge of freshwater is heated in the concentrated solar power system 22 to, for example, 1000° F. (538° C.). That is, the desalinization plant 20 utilizes the initial charge of freshwater into the seawater loop 28 to begin the process in an essentially clean freshwater condition prior to introduction of seawater into the seawater loop 28 until the desalinization plant 20 reaches an operational temperature (FIG. 2). Alternatively, seawater may be used as the initial charge with a purification or rejection process.

The initial charge of freshwater is communicated through the heat exchangers 32A, 32B and the receiver 24 while the desalination plant 20 is increased to operational temperature so that follow-on seawater will be sufficiently heated to above boiling to produce steam upon introduction. Steam flashes off from the seawater downstream of the second heat exchanger 32B within, for example, a flash tank 33. The sudden evaporation or "flashing" occurs when the hot seawater at some higher pressure is suddenly released to a lower pressure within the flash tank 33. The flash tank 33 may be integrated with the second heat exchanger 32B and may be referred to as a flash tank heat exchanger system. It should be understood that various flash processes and other heat recovery systems are well known and need not be described in detail herein.

A more concentrated brine exits via a salt water return from the flash tank 33. The brine may then be returned to the sea or a portion of the brine may be used to produce sea salt as a byproduct.

From the flash tank 33, the steam is superheated in the receiver 24. The superheated steam from the receiver 24 is then communicated back into the heat exchanger 32 to increase the seawater which is communicated through the heat exchanger 32.

Downstream of the heat exchanger 32, the superheated steam is utilized to power the steam turbine 34. Discharge from the steam turbine 34 may include relatively cooler steam and condensed freshwater. The discharge is communicated through the condenser 30 for additional cooling, from which freshwater is discharged for downstream use.

The steam turbine 34 may also drive the electric generator 36. The electric generator 36 produces electricity which may be utilized to power the desalinization plant 20. Moreover, any additional excess electricity may be supplied to an electrical grid. It should be understood that various steam turbine and generator systems may be utilized herewith and need not be described in detail herein. It should be understood that various steam turbine and generator systems may be utilized herewith and need not be described in detail herein.

Alternatively, or in addition thereto, the seawater may be communicated across a selectively permeable osmotic membrane 38 located between the first heat exchanger 32A and the second heat exchanger 32B. The osmotic membrane 38 facilitates unrestricted passage of water, but not the solute. The osmotic membrane 38 may also receive energy from the seawater heated by the first heat exchanger 32A to further improve efficiency as the osmotic membrane 38 may facilitate a greater flow rate. It should be understood that other arrangements which do not utilize the osmotic membrane 38 may alternative be provided.

Figure 3:
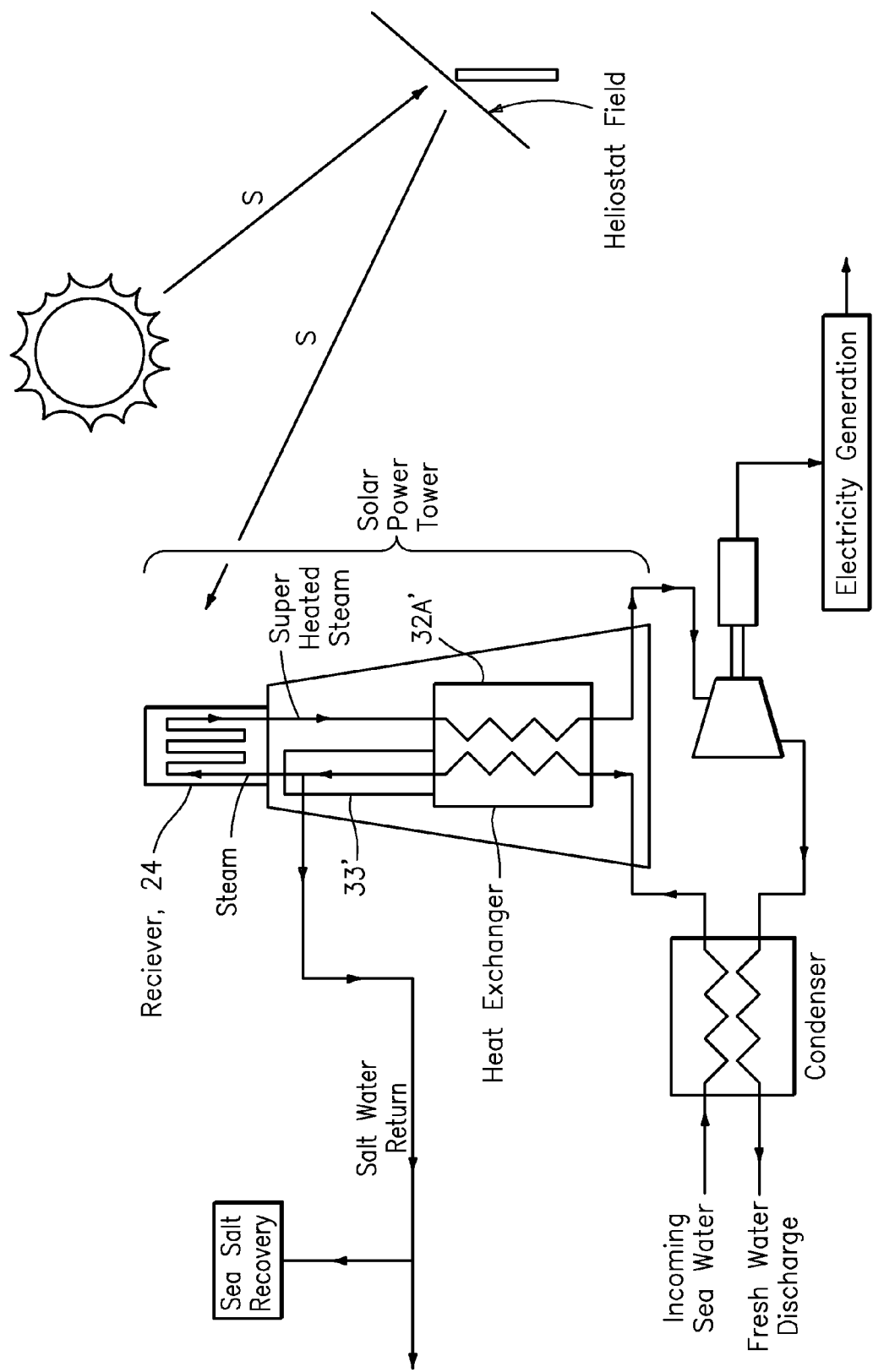
FIG. 3 is a schematic diagram of another non-limiting embodiment of a desalination plant.

Referring to FIG. 3, another desalinization plant 20' includes only a first heat exchanger 32A'. Downstream of the first heat exchanger 32A' the flash tank 33' separates the steam from the seawater such that the more concentrated brine exits via the salt water return. The steam is then superheated in the receiver 24 prior to communication back through the first heat exchanger 32A'. The superheated steam form the first heat exchanger 32A' then powers the steam turbine 36.

Applicant has determined through modeling that a 40 MW-thermal power desalinization plant 20 may produce a minimum of 30 million gallons of water per year.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A desalinization plant comprising:
   a concentrated solar power system including a receiver arranged to receive solar radiation from a plurality of heliostats;
   a seawater loop arranged to communicate steam through said receiver, said seawater loop including at least one heat exchanger to transfer energy to the seawater within said seawater loop to extract steam from the seawater, wherein said seawater loop includes a flash tank arranged upstream of said receiver between said heat exchanger and said receiver, including a steam line and a salt water return line connected as outputs from the flash tank, said steam line being connected to communicate steam from said flash tank into said receiver and said salt water return line being connected to communicate seawater from said flash tank to a sea salt recovery system;
   a turbine driven by the steam; and
   a condenser downstream of the turbine to produce freshwater from the steam.

2. The desalinization plant of claim 1, wherein the steam is extracted from said heat exchanger via boiling.

3. The desalinization plant of claim 1, wherein the steam is extracted from said at least one heat exchanger via flashing.

4. The desalinization plant of claim 1, further comprising an osmotic membrane to at least partially extract a solute from the seawater downstream of said at least one heat exchanger.

5. The desalinization plant of claim 1, wherein said condenser receives seawater and said heat exchanger is arranged to receive as a first input the seawater from said condenser and as a second input heated steam from said receiver.

6. The desalinization plant of claim 1, wherein said concentrated solar power system includes a tower structure, and said heat exchanger is arranged within said tower structure.

7. The desalinization plant of claim 1, wherein said at least one heat exchanger includes a first heat exchanger and a second heat exchanger, and said seawater loop includes an osmotic membrane arranged to receive seawater as a first input from said first heat exchanger and discharge the seawater directly to said second heat exchanger.

8. The desalinization plant of claim 7, wherein said osmotic membrane is arranged to receive as a second input steam directly from said turbine.

9. The desalinization plant of claim 1, wherein said at least one heat exchanger includes a first heat exchanger and a second heat exchanger that are arranged to serially receive the seawater into said first heat exchanger from said condenser and then into said second heat exchanger and serially receive the steam from said receiver into said second heat exchanger and then into said first heat exchanger.

10. A desalinization plant comprising:
    a concentrated solar power system including a receiver arranged to receive solar radiation from a plurality of heliostats;
    a seawater loop arranged to communicate steam through said receiver, said seawater loop including:
        a first heat exchanger and a second heat exchanger that are arranged to serially receive seawater into said first heat exchanger and then into said second heat exchanger to produce the steam and serially receive the steam from the receiver into said second heat exchanger and then into said first heat exchanger, and
        an osmotic membrane arranged to receive seawater as a first input from said first heat exchanger and discharge the seawater directly to said second heat exchanger;
    a turbine driven by the steam from the second heat exchanger, wherein said osmotic membrane is arranged to receive as a second input any remaining steam and any condensed water directly from said turbine; and
    a condenser downstream of the osmotic membrane and arranged to receive new seawater into said seawater loop, said condenser being arranged to provide the new seawater to said first heat exchanger.

* * * * *